United States Patent
Lee et al.

(10) Patent No.: US 8,150,150 B2
(45) Date of Patent: Apr. 3, 2012

(54) METHOD AND SYSTEM OF EXTRACTING A PERCEPTUAL FEATURE SET

(75) Inventors: Gwo Giun Lee, Tainan (TW);
Ming-Jiun Wang, Tainan (TW);
Ling-Hsiu Huang, Tainan (TW)

(73) Assignees: Himax Technologies Limited, Tainan County (TW); NCKU Research and Development Foundation, Tainan (TW)

( * ) Notice: Subject to any disclaimer, the term of this patent is extended or adjusted under 35 U.S.C. 154(b) by 636 days.

(21) Appl. No.: 12/396,380

(22) Filed: Mar. 2, 2009

(65) Prior Publication Data
US 2010/0220924 A1  Sep. 2, 2010

(51) Int. Cl.
*G06K 9/34* (2006.01)
(52) U.S. Cl. .......................... 382/164; 382/162; 382/165
(58) Field of Classification Search .................. 382/162, 382/164, 165; 345/589, 590; 358/418, 518, 358/520, 453; 700/109; 702/84
See application file for complete search history.

(56) References Cited

U.S. PATENT DOCUMENTS
7,333,237 B2 * 2/2008 Ogatsu et al. .................. 358/1.9
7,853,075 B2 * 12/2010 Mattausch et al. ............ 382/164
* cited by examiner

*Primary Examiner* — Anh Hong Do
(74) *Attorney, Agent, or Firm* — Stout, Uxa, Buyan & Mullins, LLP

(57) ABSTRACT

A method and system of extracting a perceptual feature set for image/video segmentation are disclosed. An input image is converted to obtain a hue component and a saturation component, where the hue component is quantized into a number of quantum values. After weighting the quantized hue component with the saturation component, the weighted quantized hue component and the saturation component are subjected to a statistical operation in order to extract feature vectors. Accordingly, the method and system provide overall segmentation results that are very close to human interpretation.

16 Claims, 2 Drawing Sheets

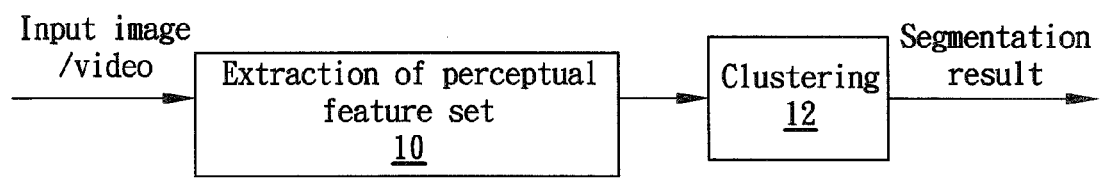
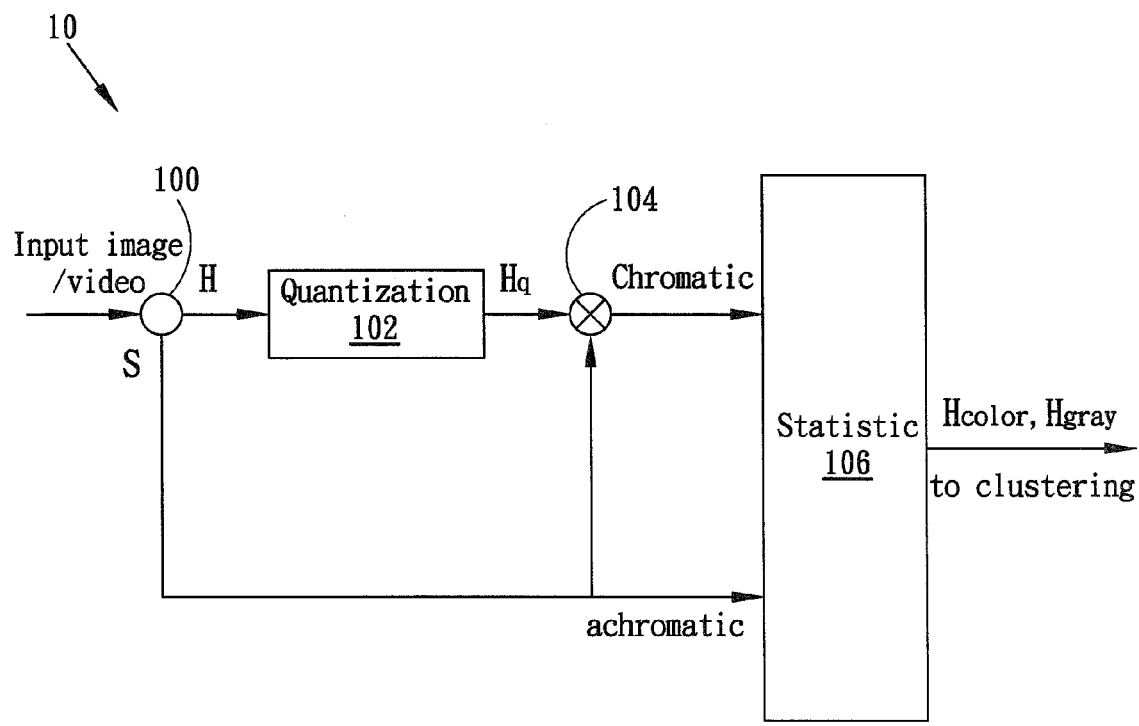
FIG. 1
FIG. 2

METHOD AND SYSTEM OF EXTRACTING A PERCEPTUAL FEATURE SET

BACKGROUND OF THE INVENTION

1. Field of the Invention

The present invention generally relates to image segmentation, and more particularly to extraction of a perceptual feature set for image/video segmentation.

2. Description of the Prior Art

Image segmentation is a type of image analysis operation that breaks an image into individual objects or regions by highlighting or isolating individual objects within the image. Image segmentation can be useful in locating objects and boundaries within an image or video in applications such as computer vision. Intensity and/or texture information is commonly used to perform segmentation on gray-scale images.

Color information and texture information are used in color image segmentation. A proper feature set for describing the colors and textures within the image is essential for meaningful image/video segmentation that approximates human visual interpretation or perception. Textural features are commonly described by statistical methods and spectral methods. Common statistical methods are $K^{th}$ order moment, uniformity, entropy, and co-occurrence matrix. Common spectral methods are Laws filter, discrete cosine transform (DCT), Fourier domain analysis with ring and wedge filter, Gabor filter bank, and wavelength transform. Color features, on the other hand, are commonly described using a variety of color spaces, such as RGB (red/green/blue), YUV, CIELAB and HSI (hue/saturation/intensity). As the HSI color space is very close to that for human interpretation of color, it is commonly used in various applications of computer vision. However, the color textures are usually difficult to describe using color features, textural features or their combination. Better color/texture features usually have high dimensionality and thus complicate the subsequent processing in the segmentation operation.

For the reason that conventional color/texture features could not be effectively used to describe colors and textures within the image, a need has thus arisen to propose a novel feature set in describing colors and textures, making the overall segmentation results close to human interpretation.

SUMMARY OF THE INVENTION

In view of the foregoing, it is an object of the present invention to provide a feature set, particularly a perceptual feature set, in image/video segmentation to effectively reduce the amount of calculations, approximate the human interpretation of chromatic and achromatic colors, and make the overall segmentation results very close to human interpretation.

According to one embodiment, an input image is converted into, for example, HSI color space, to obtain a hue component and a saturation component, where the hue component is quantized into a number of (e.g., six) quantum values. In a preferred embodiment, the six quantum values are red, yellow, green, cyan, blue and magenta. After weighting (or multiplying) the quantized hue component with the saturation component, the weighted quantized hue component and the saturation component are subjected to a statistical operation in order to extract feature vectors. In one embodiment, a histogram representing texture feature(s) is obtained for each pixel centering around a block.

BRIEF DESCRIPTION OF THE DRAWINGS

FIG. 1 shows a block diagram illustrating a method or system of image/video segmentation based on a perceptual feature set according to one embodiment of the present invention;

FIG. 2 shows a detailed block diagram illustrating the method or system for extracting the perceptual feature set according to the embodiment of the present invention;

DETAILED DESCRIPTION OF THE INVENTION

FIG. 1 shows a block diagram illustrating a method or system of image/video segmentation based on a perceptual feature set according to one embodiment of the present invention. In the embodiment, the input image or video is processed in block 10 to extract a perceptual feature set or feature vectors. The details of the feature set extraction will be discussed later in accompaniment with FIG. 2. After completion of the feature extraction, the extracted feature vectors are separated or classified in block 12 using, for example, a clustering algorithm. Among the variety of available clustering algorithms, a K-means clustering technique may be used in performing the classification, thereby arriving at the segmentation result.

FIG. 2 shows a detailed block diagram illustrating the method or system for extracting the perceptual feature set according to the embodiment of the present invention. At the beginning, an input image/video is converted into a representation in HSI (hue/saturation/intensity) color space by a conversion unit 100. That is, each pixel of the input image/video is converted into a hue component H, a saturation component S and an intensity component. As the intensity component will not be used in later processing, the intensity component is not shown in the figure. As used herein, the term "unit" denotes a circuit, a piece of program, or their combination. In general, the method and system of the present invention may be implemented in whole or in part using software and/or firmware, including, for example, one or more of a computer, a microprocessor, a circuit, an Application Specific Integrated Circuit (ASIC), a programmable gate array device, or other hardware. While the HSI color space is demonstrated here, it is appreciated that other related color spaces, such as HSL (hue/saturation/lightness) or HSV (hue, saturation/value) may be used instead.

Figure 3:
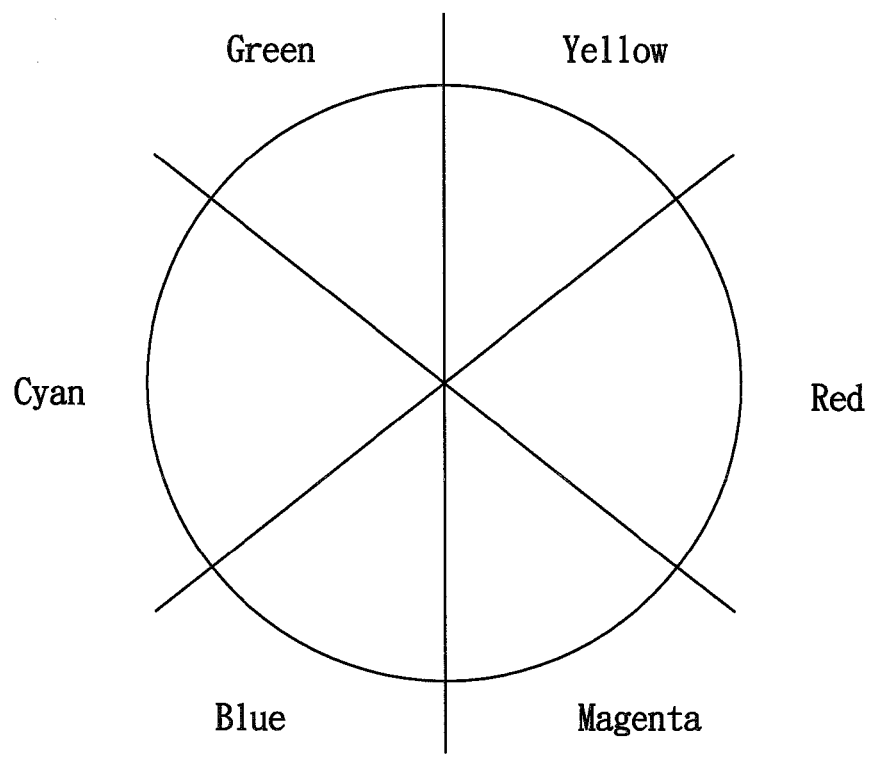
FIG. 3 shows quantization of the hue circle in the preferred embodiment.

The hue component H of the pixel is then quantized to one of a number of discrete quantum values by a quantization unit 102. In the embodiment, the entire range of hue is preferably divided (or quantized) into six discrete quantum values: red, yellow, green, cyan, blue and magenta. FIG. 3 shows quantization of the hue circle in the preferred embodiment. The reason that the hue range is quantized into six quantum values in the manner as shown in the figure is to provide conformance to the perception of the user's eyes. It is appreciated that a quantization number other than (i.e., more or less than) six may be adapted. Further, the degree of each quantum level in the hue circle need not be the same (i.e., 60°).

It can be observed that, for each quantization value in the quantized hue circle of FIG. 3, the more saturated hue (nearer to the circle perimeter) has the same quantum value as the less saturated hue (nearer to the circle center). Accordingly, the saturation component S of the pixel is then used as a weighting coefficient (or factor) to the quantized hue component $H_q$ through a weighting unit 104. In practice, the quantized hue component $H_q$ is multiplied (or weighted) by its corresponding saturation component S by a multiplier 104, therefore resulting in a chromatic feature, while the saturation component S acts as an achromatic feature. As the quantization number is six in the preferred embodiment, the chromatic feature thus has a dimension of six. The chromatic feature with a dimension of six and the achromatic feature with a dimension of one together result in the feature set with a dimension of seven in the preferred embodiment.

The chromatic feature and the achromatic feature are then subjected to statistical manipulation by a statistical unit 106, thereby obtaining the feature set for describing the colors and textures within the image/video. In the embodiment, the feature vectors of a pixel in the image/video may be obtained by $$H_{color} = \sum_{p \in color, p \in B} S_p \quad (1)$$

$$color \in \{red, yellow, green, cyan, blue, magenta\}$$

$$H_{gray} = \sum_{p \in B} (1 - S_p) \quad (2)$$

where
p is a pixel,
B is the block centered at the current pixel whose feature is under extraction, and
$S_p$ represents the saturation of p ranging from 0 to 1.

Figure 4A:
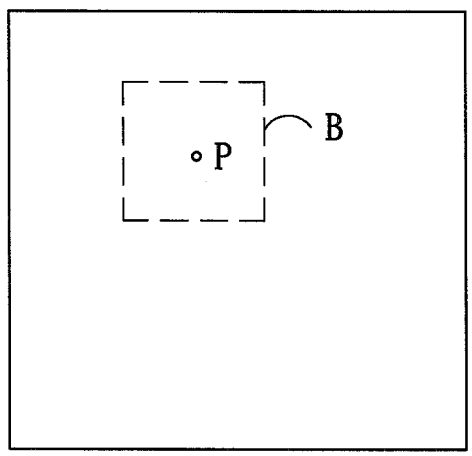
FIG. 4A shows an image in which a block B is centered at the current pixel p whose feature is under extraction.
Figure 4B:
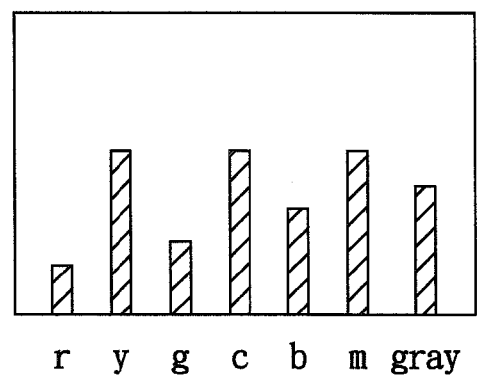
FIG. 4B shows exemplary chromatic and achromatic feature vectors $H_{color}$ and $H_{gray}$ in the form of a histogram.

Specifically, FIG. 4A shows an image in which a block B is centered at the current pixel p whose feature is under extraction. Within block B, the saturation values with respect to each respective color are summed up to get respective $H_{color}$. FIG. 4B shows exemplary chromatic and achromatic feature vectors $H_{color}$ (that is, $H_{red}$ (r), $H_{yellow}$ (y), $H_{green}$ (g), $H_{cyan}$ (c), $H_{blue}$ (b), $H_{magenta}$ (m)) and $H_{gray}$ (gray) depicted in the format of a histogram. It is worth noting that each pixel should have its specific associated histogram, which therefore may be used to represent its texture feature. The clustering block 12 in FIG. 1 performs the classification based on the received chromatic and achromatic feature vectors $H_{color}$ and $H_{gray}$ (gray). That is, the pixels having similar histograms are classified into the same segment, and vice versa.

According to the embodiment discussed above, quantization of the hue circle using crisp (or hard) threshold(s) can effectively reduce the amount of complex calculations involved in conventional segmentation techniques. Further, separation of the chromatic components ($H_{color}$) and the achromatic component ($H_{gray}$) using weighted coefficient(s) can approximate the human interpretation of chromatic and achromatic colors and can avoid hue misjudgment under the situation of low saturation. Moreover, it is observed that the proposed scheme renders very similar values for the same smooth/textural color regions and highly discernible values for distinct smooth/textural color regions, thus making the overall segmentation results very close to human interpretation.

Although specific embodiments have been illustrated and described, it will be appreciated by those skilled in the art that various modifications may be made without departing from the scope of the present invention, which is intended to be limited solely by the appended claims.

What is claimed is:

1. A method of extracting a perceptual feature set, comprising using a processor to perform the steps of:
    converting an input image to obtain a hue component and a saturation component;
    quantizing the hue component into a plurality of quantum values;
    weighting the quantized hue component with the saturation component; and
    subjecting the weighted quantized hue component and the saturation component to a statistical operation in order to extract feature vectors.

2. The method of claim 1, wherein the input image is converted into a representation in HSI (hue saturation/intensity) color space.

3. The method of claim 1, wherein the hue component is quantized into six quantum values.

4. The method of claim 3, wherein the six quantum values are red, yellow, green, cyan, blue and magenta.

5. The method of claim 1, wherein the quantized hue component is multiplied by the saturation component.

6. The method of claim 1, wherein a block (B) is centered at a current pixel (p) whose feature is under extraction; and within the block, the feature vectors including chromatic and achromatic feature vectors $H_{color}$ and $H_{gray}$ are obtained using the saturation components ($S_p$) with respect to each respective color as a histogram and expressed as $$H_{color} = \sum_{p \in color, p \in B} S_p$$

$$color \in \{red, yellow, green, cyan, blue, magenta\}$$

$$H_{gray} = \sum_{p \in B} (1 - S_p).$$

7. The method of claim 1, further comprising a step of classifying the extracted feature vectors.

8. The method of claim 7, wherein the extracted feature vectors are classified using a clustering technique.

9. A system for extracting a perceptual feature set, comprising:
    a conversion unit configured to convert an input image to obtain a hue component and a saturation component;
    a quantization unit configured to quantize the hue component into a plurality of quantum values;
    a weighting unit configured to weigh the quantized hue component with the saturation component; and
    a statistical unit configured to subject the weighted quantized hue component and the saturation component to a statistical operation in order to extract feature vectors.

10. The system of claim 9, wherein the conversion unit is configured to convert the input image into a representation in HSI (hue/saturation/intensity) color space.

11. The system of claim 9, wherein the quantization unit is adapted to quantize the hue component into six quantum values.

12. The system of claim 11, wherein the six quantum values are red, yellow, green, cyan, blue and magenta.

13. The system of claim 9, wherein the weighing unit is configured to multiply the quantized hue by the saturation component.

14. The system of claim 9, wherein:
    a block (B) is centered at a current pixel (p) whose feature is under extraction;
    the saturation unit is configured to obtain from within the block the feature vectors including chromatic and achromatic feature vectors $H_{color}$ and $H_{gray}$; and the feature values are obtained using the saturation components($S_p$) with respect to each respective color as a histogram and expressed as $$H_{color} = \sum_{p \in color, p \in B} S_p$$

$$color \in \{red, yellow, green, cyan, blue, magenta\}$$

$$H_{gray} = \sum_{p \in B} (1 - S_p).$$

15. The system of claim 9, further comprising a classifying unit configured to classify the extracted feature vectors.

16. The system of claim 15, wherein the classifying unit is configured to use a clustering technique to classify the extracted feature vectors.

* * * * *